United States Patent [19]

Leib

[11] Patent Number: 4,457,653
[45] Date of Patent: Jul. 3, 1984

[54] RETRIEVABLE TOGGLE ASSEMBLY
[76] Inventor: David S. Leib, 9105 Hereford Ct., Stockton, Calif. 95209
[21] Appl. No.: 383,279
[22] Filed: May 28, 1982
[51] Int. Cl.$^3$ .............................................. F16B 21/00
[52] U.S. Cl. ..................................... 411/342; 411/344; 411/908; 411/373
[58] Field of Search ................................ 411/340–346, 411/350, 429, 430, 431, 373–377, 907, 908

[56] References Cited

U.S. PATENT DOCUMENTS 2,024,871  12/1935  Parsons ................................ 411/342
3,285,118  11/1966  Elkins .................................. 411/346
3,513,746   5/1970  Forsberg ............................. 411/346

FOREIGN PATENT DOCUMENTS 1843053  12/1961  Fed. Rep. of Germany ...... 411/431
38137     1/1915  Sweden ............................... 411/342

Primary Examiner—Gary L. Smith
Assistant Examiner—Neill Wilson
Attorney, Agent, or Firm—Flehr, Hohbach, Test, Albritton & Herbert

[57] ABSTRACT

A retrievable toggle bolt assembly characterized by a cup for receiving the hinged toggle elements as the bolt is unscrewed from a wall or ceiling panel. The cup is formed to provide indication as to complete attachment of the bolt to a cap carried thereon.

7 Claims, 3 Drawing Figures

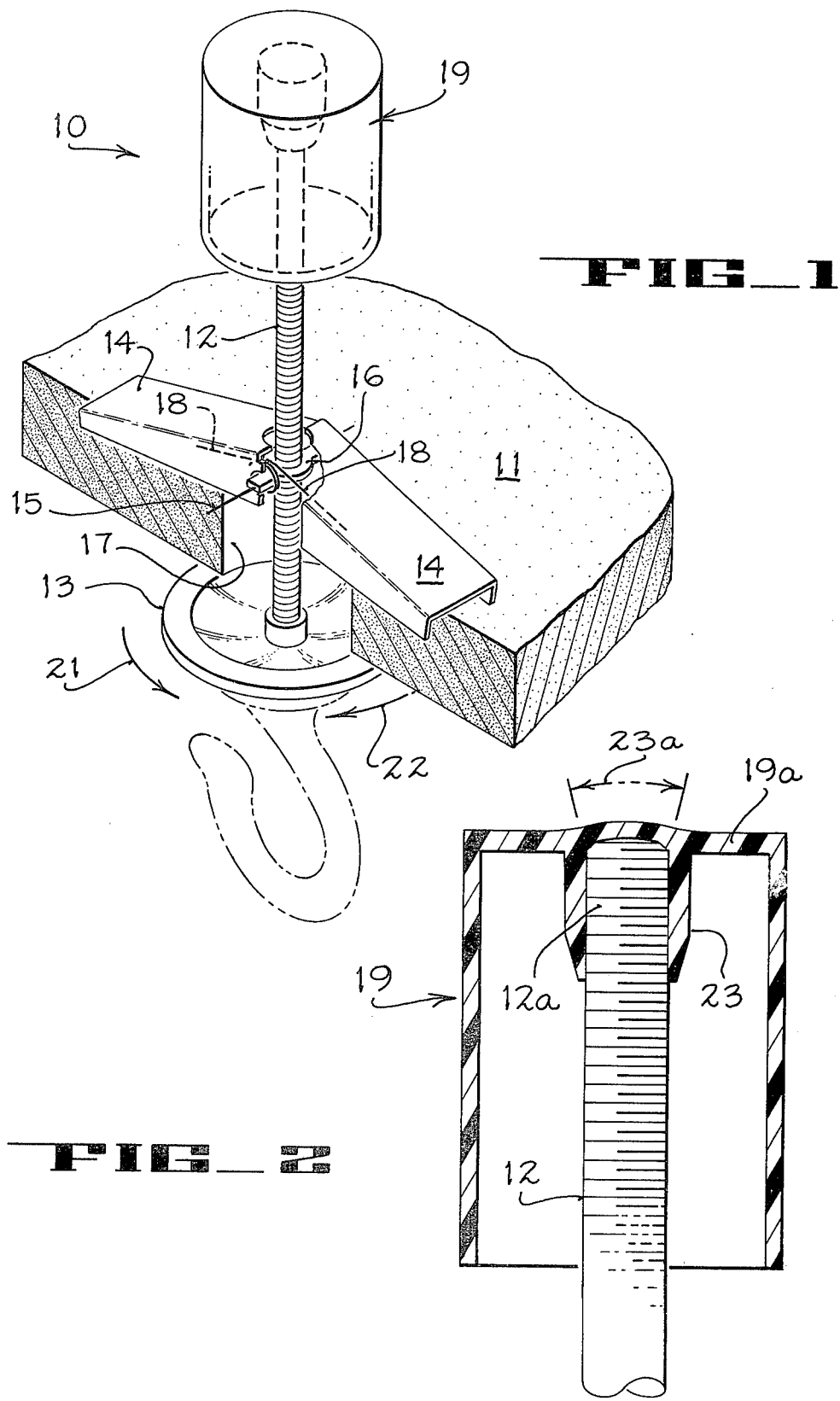
FIG_1
FIG_2

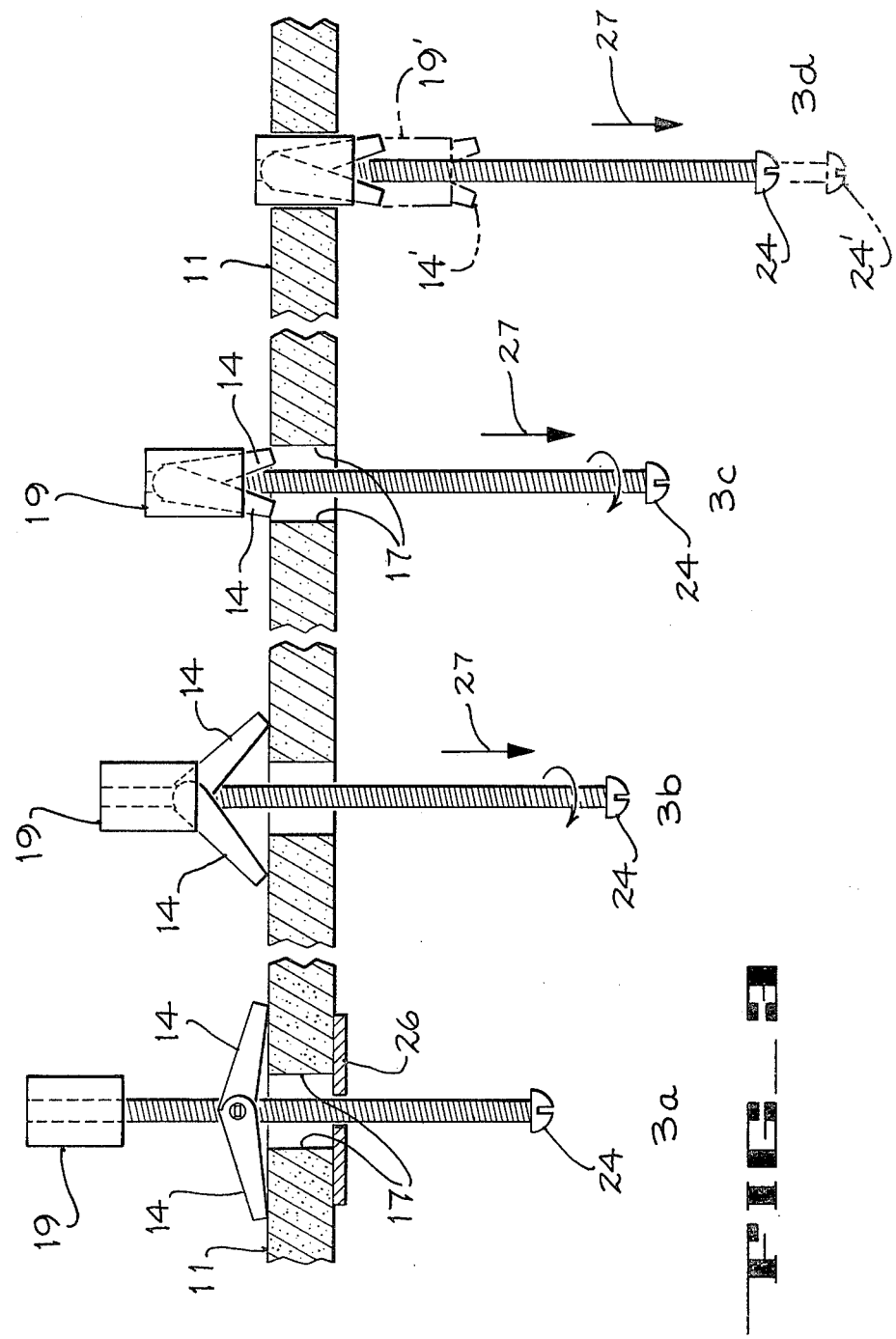

RETRIEVABLE TOGGLE ASSEMBLY

This invention pertains to a fastening assembly and more particularly to a fastening assembly such as a toggle bolt wherein the toggle elements can be retrieved after usage.

In the past, toggle bolts of a type employing a pair of expandable elements adapted to cooperate with the back side of a panel such as a wall of ceiling have generally been arranged whereby they are virtually impossible to retrieve.

In general, a retrievable fastener assembly including an elongate bolt adapted to be disposed through a wall or ceiling panel carries a cup shaped cap on one end of the bolt to be inserted through an opening through the panel along with a pair of toggle elements threadedly engaged along the bolt. The cup includes open and closed ends. The open end of the cup is arranged in a manner whereby screwing the bolt "toward" the panel serves to draw the toggle elements toward the back of the panel thereby applying a clamping pressure to the panel between the head of the bolt and the toggle elements. Unscrewing the bolt serves to move the toggle elements axially along the bolt and ultimately into the cap carried on the end of the bolt. With the toggle elements disposed within the cap, the entire assembly can be removed from the panel.

In general it is an object of the present invention to provide an improved fastening assembly.

It is another object of the invention to provide an improved retrievable toggle bolt assembly.

It is a further object of the invention to provide a toggle bolt assembly of the type having improved means permitting the entire assembly to be retrieved from a position of prior usage.

The foregoing and other objects of the invention will become more readily evident when considered in conjunction with the drawings.

FIG. 1 shows a diagrammatic perspective view partially broken away of a toggle assembly according to the invention and employing a hook at the outer end of the toggle bolt for purposes of hanging a plant or the like;

FIG. 2 shows an enlarged elevation section view of a cap member carried on one end of a toggle bolt; and FIGS. 3a through 3f, respectively, show a sequence of stages involved in retrieving a toggle bolt assembly of the kind described from a panel.

As shown in FIG. 1 a retrievable fastener assembly 10 for holding an object to a wall or ceiling panel 11 includes an elongate threaded toggle bolt 12 and fastening means such as a pair of toggle elements 14 threadly carried by bolt 12 for movement therealong and disposed to act against the back side of panel 11. Means such as the hook unit 13 secured to the outer end of bolt 12 can be employed to rotate bolt 12, for example, rotated clockwise (as seen from below) as represented by the arrow 21 and counterclockwise as shown by the arrow 22.

Toggle elements 14 are typically mutually hinged at 15 and threadedly carried along bolt 12 by means of a traveling nut 16. Means yieldingly urging toggle elements 17 to move radially away from bolt 12 includes the spring 18. Thus, by rotating bolt 21 clockwise toggle elements 14 are tightened against the back of panel 11.

The region around bolt 12 and protruding behind panel 11 remains substantially unobstructed with respect to elements 14 in all radial directions so as to permit elements 14 to move freely away from bolt 12 in substantially all radial directions free of obstruction. A cup shaped cap 19 preferably of plastic material carried axially of bolt 12 is disposed for receiving both toggle elements 14 in a mutually folded condition in response to unscrewing bolt 12 in the direction 22.

Thus, with cap 19 secured to the end of bolt 12, and with elements 14 engaging the back surface of panel 11, as bolt 12 is unscrewed toggle elements 14 will be carried by nut 16 toward cap 19 since restraint against rotation of elements 14 caused by friction between elements 14 and the back surface of panel 11 permits bolt 12 to rotate with respect thereto. So long as they remain engaged against the back surface of panel 11. Since elements 14 will not be rotating (or at least not rotating as much as bolt 12) nut 16 will continue to advance toward cap 19 and eventually enter into cap 19 carrying elements 14 with it.

Minimal downward force applied to bolt 12 during this unscrewing action causes increased friction between elements 14 and the back surface of panel 11 to enhance the operation of the device.

Means as now to be described for fastening cap 19 securely to the end 12a of bolt 12 includes means carried by the cap or cup-shaped unit 19 for positively engaging the end of bolt 12.

Thus, as shown in FIG. 2 the cup-shaped cap portion includes a cup 19 having both a closed and an open end 19a, 19b, respectively. A re-entrant cylindrical cup portion 23 carried by the closed end 19a protrudes axially into cup 19 from closed end 19a. Re-entrant cylindrical portion 23 has been formed to engage and hold the inserted threaded end 12a of bolt 12 which can be screwed into same and form its own threads in the process.

Means are provided for detecting the fact that bolt 12 has been fully engaged into cylindrical portion 23. Thus, plastics of known type which, when stretched, change color can be employed in the molding of cup 19 to form end 19a thin enough whereby as end 12a causes a slight bulge in the region 23a of closed end 19a there will be a distinct change of coloration to the plastic material. Thus, it will be readily evident from external inspection that the bolt has been fully inserted into the re-entrant cylindrical portion 23 so as to be certain that cap 19 is properly fastened.

In operation, an opening 17 sufficiently large to permit the passage of cap 19 therethrough has been formed through panel 11 prior to insertion of toggle bolt assembly 10.

As shown in the embodiment in FIG. 3 a simple screw head 24 has been substituted for hook unit 13 so as to provide the means for rotating bolt 12. In addition, a washer 26 arrests the upward movement of head 24 when the toggle bolt assembly is being applied to panel 11.

To retrieve toggle bolt assembly 10, bolt 12 is turned counterclockwise or unscrewed in the direction 22. Initially the engagement between elements 14 and the back surface of panel 11 will prevent elements 14 from rotating while nut 16 advances upwardly (as shown) along bolt 12. Eventually, however, there may be insufficient restraint defined between elements 14 and the back surface of panel 11 to prevent rotation of the toggle elements and at that point it will be necessary to pull downwardly on bolt 12 (as represented by arrow 27) while continuing to unscrew bolt 12. As shown in FIGS. 3c and 3d, the upward movement of nut 16 carrying elements 14 therewith draws the foldable toggle elements 14 into the interior of cup 19 where they are retained as shown in FIGS. 3d through 3f.

After elements 14 have been sufficiently captured within cap 19, assembly 10 may be removed in its entirety simply by pulling outwardly on bolt 12.

From the foregoing it will be readily evident that there has been provided an improved retrievable toggle bolt assembly of type in which the toggle element will not be lost by unscrewing the bolt and of improved design whereby the removal of the assembly is relatively simple.

I claim:

1. A retrievable fastener assembly for holding an object to a wall or ceiling panel comprising an elongate threaded bolt, fastening means threadedly carried by said bolt for movement therealong to act against the back side of the panel to permit said bolt to be tightened against said panel by screwing said bolt in a first direction, the last named means comprising a pair of mutually hinged toggle elements threadedly carried by said bolt to be moved betwen advanced and retracted positions therealong, and means yieldingly urging said elements to move away from said bolts, the region around that portion of said bolt protruding beyond the back of the panel being substantially unobstructed with respect to said elements in all radial directions to permit said elements to move freely away from said bolt in substantially all radial directions free of obstruction, and cup-shaped means carried axially of said bolt and disposed for receiving both said toggle elements in a mutually folded condition in response to unscrewing said bolt in a direction opposite said first direction.

2. A retrievable fastener assembly according to claim 1 in which said cup-shaped means and said bolt are screwed together axially of each other.

3. A retrievable fastener assembly according to claim 1 in which said cup-shaped means includes means carried therewith for positively engaging the end of said bolt.

4. In a retrievable fastener assembly of a type adapted to retract outwardly sprung toggle elements by moving the elements into a cup-shaped cap portion, said cup-shaped cap portion comprising a cylindrical cup having an open and a closed end, a re-entrant cylindrical portion carried by said closed end to protrude axially into said cup from said closed end, said re-entrant cylindrical portion being adapted to engage and hold the inserted end of an elongate bolt threaded into same.

5. In a retrievable fastener assembly comprising an elongate bolt adapted to be disposed through a wall or ceiling panel, a cup carried on that end of said bolt which is adapted to be inserted through said panel, said cup having open and closed ends thereof, and means for holding said cup onto said end, the last named means comprising a re-entrant cylindrical cup having open and closed ends thereof, respectively, the last named said cup being disposed axially of the first named cup, the open end of each cup being accessible from the same direction to permit said bolt to be threaded into said re-entrant cup.

6. In a retrievable fastener assembly as in claim 5 in which the thickness of material in said closed end of said cup is thin enough to permit the inserted end of said bolt to stretch the end surface of said re-entrant cup, said plastic having the known characteristic of changing coloration upon being stretched, whereby complete insertion of said bolt can be detected by examination of the exterior of said closed end.

7. In a retrievable fastener assembly of a type adapted to retract outwardly sprung toggle elements by moving the elements into a cup-shaped cap portion of plastic material, said cup-shaped cap portion comprising a cylindrical cup having an open and a closed end, a re-entrant cylindrical portion carried by said closed end to protrude axially therefrom into said cup, said re-entrant cylindrical portion being adapted to engage and hold the inserted end of an elongate bolt threaded into same, the thickness of material in said closed end of said cup being thin enough to permit the inserted end of the bolt to stretch the end surface of said re-entrant cup, said plastic material being of a type having the known characteristic of changing coloration upon being stretched, whereby complete insertion of said bolt can be detected by examination of the coloration of the exterior of said closed end.

* * * * *